Sept. 25, 1956 A. P. MUSSNIG 2,763,933
GAUGING DEVICE
Filed Feb. 19, 1953
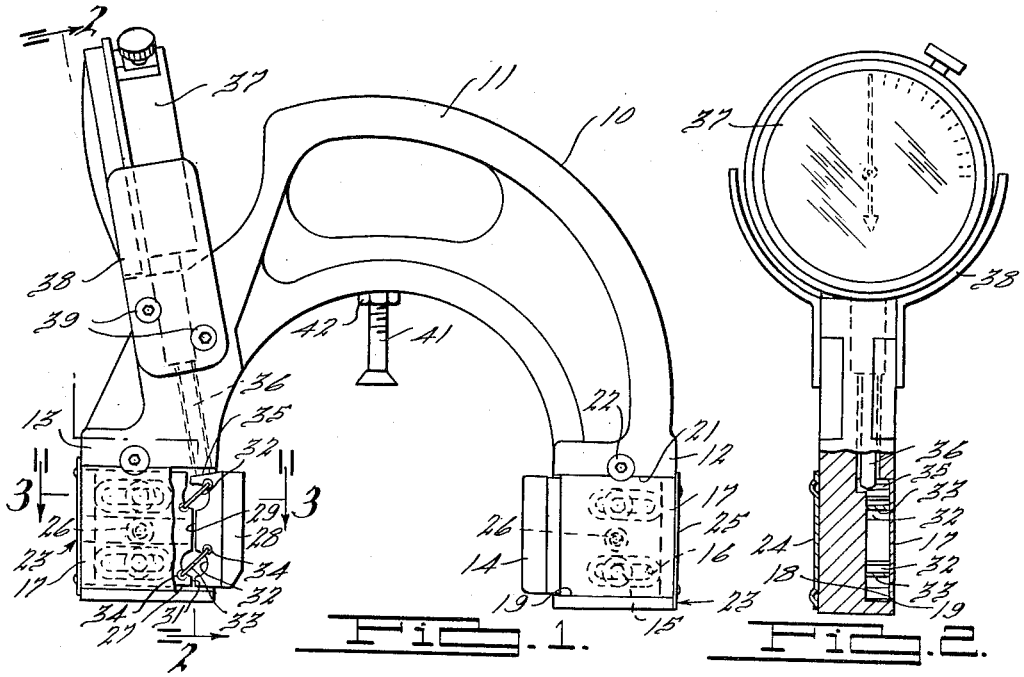
Fig. 1. Fig. 2.
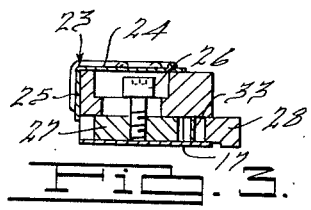
Fig. 3.
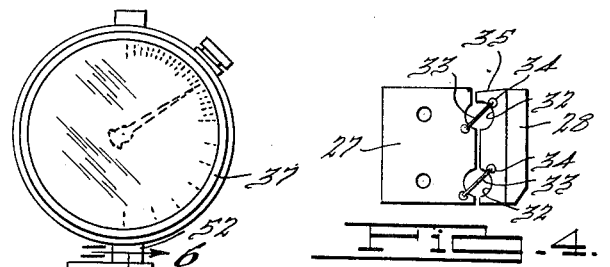
Fig. 4.
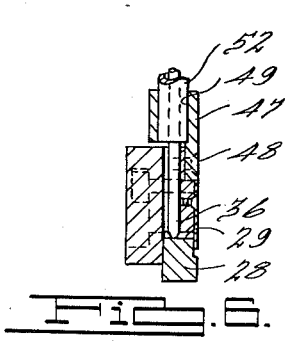
Fig. 6.
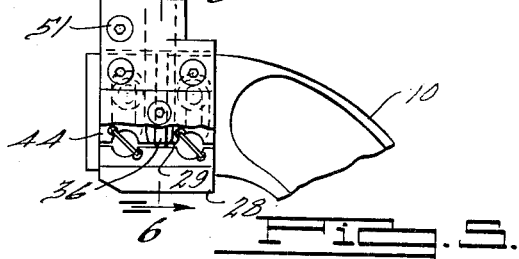
Fig. 5.
Fig. 7.
INVENTOR.
Adolph P. Mussnig.
BY
Harness, Dickey & Pierce
ATTORNEYS.

United States Patent Office 2,763,933
Patented Sept. 25, 1956

2,763,933

GAUGING DEVICE

Adolph P. Mussnig, Detroit, Mich.

Application February 19, 1953, Serial No. 337,867

7 Claims. (Cl. 33—147)

This invention relates to gauging devices, and particularly to a gauging device which provides visible reading for the dimension of an object being gauged.

The device of the present invention pertains to a C-shaped frame having on one arm thereof an adjustable gauging block of hard material and on the opposite arm thereof an adjustable gauging block having a movable anvil which contacts the end stem of a dial indicator which is mounted on the frame. The anvil is secured to the adjustable gauging block by a pair of flat stainless steel spring strips which are disposed preferably at an angle of 45° to the adjacent faces of the anvil and block, forming a parallelogram arrangement therebetween which causes a like movement of the anvil toward the block and laterally thereof. With such an arrangement, the dial gauge may have its stem disposed perpendicular to the face of the anvil or perpendicular to the end face thereof in one or the other position substantially 90° apart.

Accordingly, the main objects of the invention are: to provide a gauging device embodying a frame having a pair of adjustable gauging blocks thereon, one of which blocks carries an anvil which is movable relative thereto to actuate a dial indicator; to provide a gauging device with an adjustable block thereon having an anvil mounted on a pair of spring strips providing a parallelogram arrangement between the anvil and block so that the block may actuate a dial gauge either by end motion or by motion toward the block and, in general, to provide a gauging device having a visual indicator thereon which is simple in construction, positive in operation, and economical of manufacture.

Other objects and features of novelty of the invention will be specifically pointed out or will become apparent when referring, for a better understanding of the invention, to the following description, taken in conjunction with the accompanying drawings, wherein:

Figure 1 is a view in elevation, with parts broken away, embodying features of the present invention;

Fig. 2 is a sectional view of the structure illustrated in Fig. 1, taken on the line 2—2 thereof;

Fig. 3 is a sectional view of the structure illustrated in Fig. 1, taken on the line 3—3 thereof;

Fig. 4 is a view in elevation of the adjustable block having a deflectable anvil secured thereto;

Fig. 5 is a broken view of structure, similar to that illustrated in Fig. 1, showing another form which the invention may assume;

Fig. 6 is a broken sectional view of the structure illustrated in Fig. 5, taken on the line 6—6 thereof, and Fig. 7 is a view of the adjustable block with the movable anvil thereon, as employed in the device illustrated in Fig. 5.

Referring to Figs. 1 to 4, the gauging device embodies a C-shaped frame 10 having a handle portion 11 and two extending arms 12 and 13. The arm 12 has a gauging block 14 thereon secured in position by screws 15 extending through slots 16 in the arm 12. In this manner, the block 14 may be adjusted on the arm to various desired positions. A plate 17, having a sloping side 18 disposed in dovetailed relation to a sloping side 19 on the arm, covers the slots 16 when the opposite side 21 is secured to the arm by the head of a screw 22. An angle-shaped member 23 has a flange 24 disposed against the face of the arm 12 opposite to that having the plate 17 thereon, secured thereto by a screw 26. The flange 24 has a flange 25 which extends over the end of the slot 16 to thereby have the plate 17 and flanges 24 and 25 enclose the adjustable block 14. A similar block 27 is mounted on the arm 13 enclosed by an angle member 23 and a plate 17. The plates are secured in the same manner as they were secured on the arm 12, and the block 27 is adjustable on the arm 13 in the same manner as the block 14 is adjusted on the arm 12.

The block 27 has an anvil 28 supported thereon, the inner face 29 of the anvil and the outer adjacent face 31 of the block having apertures 32 therein across which flat spring elements 33 are secured. The ends of the spring elements are disposed in apertures 34 and secured therein by suitable means, as by solder. The spring elements are preferably made of stainless steel so as not to be tempered when heat is applied for soldering the ends within the apertures 34 of the block and anvil. The spring elements are preferably disposed at an angle of 45° to the faces 29 and 31, providing a parallelogram support between the anvil and block and producing the same degree of movement edgewise, as will occur in a direction normal thereto. A sloping face 35 is provided on one end of the anvil 28 disposed normal to a stem 36 on a dial indicator 37 which is secured on the frame.

Protective ears 38 may be mounted on each side of the frame and indicator, secured thereon by screws 39. A screw 41 may be secured to the inner surface of the C-frame 10 for adjustment thereon relative to the block 14 and anvil 28. After adjustment, the screw is retained in fixed position by a nut 42. When a work element is to be gauged, the blocks 14 and 27 are adjusted relative to the diameter to be measured, and by moving the blocks over the work elements, reading may be had on the dial indicator to show whether the diameter is plus or minus relative to a desired diameter. Accurate readings are always obtained because the flat springs 33 which support the anvil 28 function accurately at all times and are not susceptible to damage from normal use.

A further form of the invention is illustrated in Figs. 5 to 7 inclusive, that wherein a gauging block 44, similar to the block 27, is mounted on the end of the arm, the block being provided with an aperture 45 centrally thereof through which the stem 36 of the dial gauge 37 extends into engagement with the face 29 of the anvil 28. In this arrangement, the block 44 has a shouldered portion 46 to which the dial supporting member 47 is secured by screws 48. An aperture 49 is provided in the member, having one side slotted in the usual manner, to be drawn together by a screw 51 which thereby clamps the sleeve 52 of the dial indicator in fixed relation thereto. It is to be understood that where standard gauges having C-frames 10 and blocks 14 are now being employed, one of the blocks 14 may be removed, and by substituting the block 44 with the anvil 28 and dial support member 47 therefor, the fixed gauge may thereby be changed to a visual gauge employing the dial indicator 37 thereon.

What is claimed is:

1. A gauging device including, in combination, a frame having extending arms, a gauging block adjustably mounted on one arm, a base block adjustably mounted on the other arm opposite to said gauging block, an anvil, a pair of spring strips supporting said anvil on the base block with the adjacent faces in parallel relation and with the strips in parallel relation but disposed at an angle of 45° to said faces, and a dial indicator supported on said frame and having a plunger disposed in engagement with said anvil.

2. An indicating device including, in combination, a frame having spaced extending arms, a gauging block on one of said arms, a base block on the other of said arms in opposed relation to said gauging block, said base block having a face, an anvil having a face in spaced parallel relation to the face of said block, mounting means for supporting said anvil on said base block, said mounting means comprising a pair of flat springs providing a parallelogram relation with the spaced parallel faces of the anvil and base block such that the included angles are 45° and 135°, and a dial indicator mounted on said frame having a plunger in engagement with an end face of said anvil.

3. An indicating device including, in combination, a frame having spaced extending arms, a gauging block on one of said arms, a base block on the other of said arms in opposed relation to said gauging block, an anvil, said anvil and base block having a pair of aligned semicylindrical notches, a flat spring disposed across each said notch and secured to said base block and anvil providing a parallelogram relation therebetween, and a dial indicator supported on said base block having a plunger thereon extending therethrough into engagement with the adjacent face of said anvil.

4. An indicator operating device comprising a supporting block, means on said block for supporting the indicating gauge, an anvil spaced from said block opposite from said gauge supporting means, and a pair of flat springs interconnecting the block and anvil, said springs being disposed at an angle of substantially 45° to the adjacent faces of said block and anvil in parallelogram relation.

5. A device for supporting and operating a dial indicator, a supporting block, an anvil spaced from said block the adjacent faces of which have a pair of notches forming spaced openings, a pair of spring strips extending across said openings and interconnecting the block and anvil in parallelogram relation to each other, and means on said block for supporting a dial indicator with the stem thereof extending through the block into engagement with the adjacent face of said anvil.

6. In a device for actuating a dial gauge including, in combination, a block adjustably mounted on a support, an anvil, means securing said anvil to said block in spaced relation thereto for movement toward the block and for movement endwise of the anvil, said movements being simultaneous and equal, and means supported by said block for securing a dial indicator in engagement with said anvil.

7. In a dial indicator, a C frame having a pair of extending arms, a gauging block on one of said arms, a block on the other of said arms, an anvil, means for supporting said anvil for equal movements lengthwise of the anvil and normal thereto toward the block, and a dial indicator on said frame having an operating stem engaging said anvil in a manner to be actuated by one of said movements thereof.

References Cited in the file of this patent

UNITED STATES PATENTS

| | | |
|---|---|---|
| 2,135,912 | Rae | Nov. 8, 1938 |
| 2,209,628 | Munson | July 30, 1940 |
| 2,253,803 | Newberry | Aug. 26, 1941 |
| 2,309,891 | Fisk | Feb. 2, 1943 |
| 2,372,879 | Bjorklund et al. | Apr. 3, 1945 |
| 2,469,613 | Subber | May 10, 1949 |
| 2,560,203 | Aldeborgh | July 10, 1951 |
| 2,580,009 | Emery | Dec. 25, 1951 |

FOREIGN PATENTS

| | | |
|---|---|---|
| 919,352 | France | Mar. 6, 1947 |